United States Patent

[11] 3,532,014

| [72] | Inventor | Norman C. Franz<br>4620 W. 10th Ave., Apt. 902, Vancouver, British Columbia, Canada |
|---|---|---|
| [21] | Appl. No. | 764,066 |
| [22] | Filed | Oct. 1, 1968 |
| [45] | Patented | Oct. 6, 1970 |

[54] METHOD FOR THE HIGH VELOCITY LIQUID JET CUTTING OF SOFT MATERIALS
13 Claims, 1 Drawing Fig.

[52] U.S. Cl.................................................. 83/53,
83/177, 83/925
[51] Int. Cl............................................. B26f 3/00
[50] Field of Search........................................ 83/53, 177,
925; 51/321; 264/157

[56] References Cited
UNITED STATES PATENTS
2,881,503  4/1959  Johnson................... 264/157
2,985,050  5/1961  Schwacha................  83/53
3,136,649  6/1964  Keahey....................  83/53X Primary Examiner—William S. Lawson
Assistant Examiner—Leon Gilden
Attorney—Miller, Morriss, Pappas and McLeod and Ian C. McLeod ABSTRACT: A method for the high velocity liquid jet cutting of selected soft materials is described wherein jet liquid retained at the edges of the cut in the soft material is volatilized due to the heat generated at the edges of the cut because of the selection of feed rates and jet energies for the cutting which allows such volatilization. The basis for the selection of soft materials for cutting is described and includes those materials where because of construction and/or composition small but significant amounts of jet liquid is retained in the edges of the cut, such as in the case of cardboard, which is volatilized as a result of the cutting.

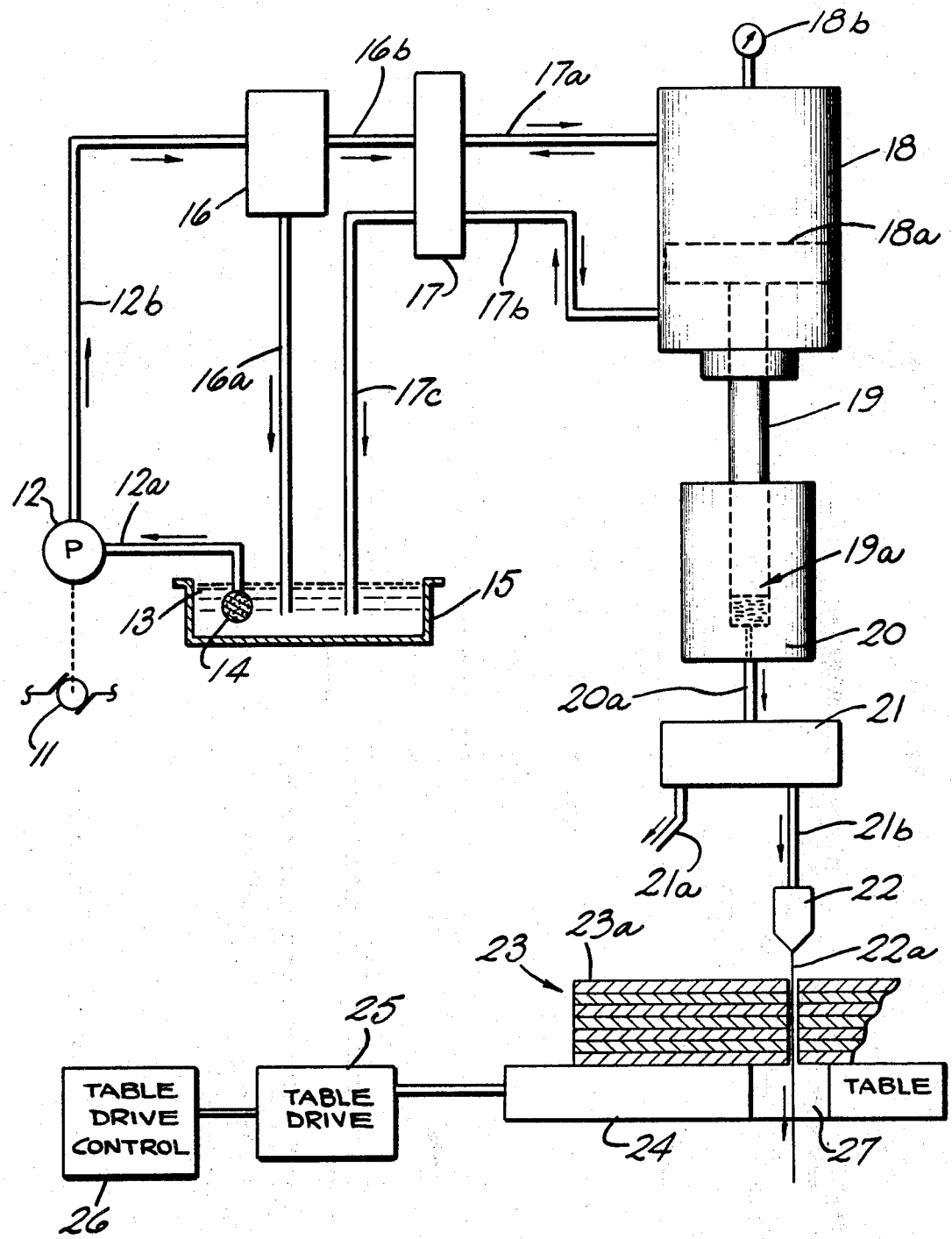

METHOD FOR THE HIGH VELOCITY LIQUID JET CUTTING OF SOFT MATERIALS

BACKGROUND OF THE INVENTION

This invention relates to the cutting to shape or size of soft materials. Particularly the present invention relates to such cutting of, for example, laminate and/or reticulate soft materials or multiple layers or sheets of such materials which present difficulties in cutting because of their contruction. Included in this class are flexible or pliable sheets of natural or synthetic organic materials such as woven and nonwoven textiles, foams, leathers, cardboard and the like.

At present, such soft materials are normally cut by manually guided knives, reciprocating knife-like or saw-like cutters, or sharp edged rotating disks, or by so-called rule dies. Die cutting is usually necessary when the material to be cut is very low in rigidity, or friction associated with moving knife or disk cutters generates sufficient heat to soften the material, causing fusing of adjacent cut material or adherence to the cutter. Use of reciprocating or rotating cutting edges allows layers of work to be stacked to a height of several inches and cut simultaneously, while die cutting permits only a few layers, perhaps less than one-half inch total thickness, to be cut per die stroke.

The common methods of cutting soft materials are often wasteful of material and require substantial manual labor and time. Reciprocating knives and rotating disks tend to result in inaccurate cuts, and are not well suited to producing small details or sharp turns in the cutting path, nor do they facilitate cut-outs of holes or shapes, particularly those of small dimensions. Further as indicated above, such cutting methods are not well adapted to thermoplastic, tacky, or easily distorted materials. Die cutting, while overcoming many of the disadvantages of reciprocating or rotating edges, permits the cutting on only a relatively few layers at a time, and tends to introduce production and handling problems with materials that adhere to the die edges or deflect beneath the cutting edges. In methods requiring cutting edges, maintenance of sharp edges is frequently costly or difficult.

In the field of high velocity liquid jets, the prior art has been particularly concerned with the cutting of hard materials such as metals and ceramics as evidenced by U.S. Pat. Nos. 2,881,503 and 2,985,050 for instance. As shown by these patents, the hard materials are cut by very high velocity liquid jets of sufficient energy and the resultant wetting of the hard material by the jet liquid during cutting is not important. Similarly, very thin soft materials such as conventional thin paper sheets can be readily cut using even low velocity liquid jets and wetting is not a problem because the thin sections of the cut dry rapidly by evaporation or are wet anyway as shown in U.S. Pat. No. 2,006,499. The difficult problem that is left unsolved is the cutting of soft materials with high velocity liquid jets where the soft material is so constructed and/or composed such that the edges of the cut retain small but significant amounts of the jet liquid and where wetting is a problem. For some years the prior art has assumed that such materials could not be productively cut using liquid jets since the retained jet liquid in the cut or otherwise on the material interfered with the subsequent processing, such as bonding or handling, and continuous production could not permit sufficient time to introduce a drying step. Further, for many of the important applications the construction and/or composition of the soft material was such that a drying step such as heated air drying was not effective or adversely affected the material being cut. For these reasons the high velocity liquid jet cutting of such soft materials has not been commercially utilized by the prior art.

SUMMARY OF THE INVENTION

This invention provides a unique, accurate, practical, fast and economical method to cut, to shape or size such soft materials by means of a high velocity fluid stream or jet directed through one or more layers or sheets of the work materials, such that jet liquid retained at the edges of the cut is volatilized in a short period of time. The cutting path is established by relative motion between the work and the line of fluid penetration. The fluid can for instance consist solely of ordinary distilled or tap water, or it may contain suitable lubricants and additives which do not adversely affect the cut. Thus the fluid can be the aqueous mixture described in copending application Ser. No. 733,495, filed May 31, 1968, which is particularly preferred. The fluid can also be of an essentially nonaqueous nature when the edges of the material being cut may be affected adversely by water such as by dissolution, providing it can be volatilized from the edges of the cut within a short period of time by the method of the present invention.

It is, accordingly, an object of this invention to provide a practical method and means for cutting soft materials rapidly and economically by means of a high velocity fluid stream or jet in a manner such that jet liquid retained at the edges of the cut is volatilized in a short period of time and wherein the bulk of the material is not wetted.

Additionally, it is an object of this invention to provide method and means whereby layers or stacks of soft materials may be cut with the liquid jet to a predetermined contour accurately, along discontinuous or continuous paths which may be straight, freely curved, sharply angled, and which may be self closing, such as is frequently required for wearing apparel, upholstered items and other products formed from soft or pliable sheet-like materials in a manner such that jet liquid retained at the edges of the cut is volatilized in a short period of time and wherein the bulk of the material is not wetted.

Still another object of this invention is to provide a method and means for such cutting of soft materials which accommodates to the use of a suitable tracer head, with or without programmed or automatic control means, to cut along predetermined continuous or discontinuous paths.

A further object of this invention is to provide a method and means for such cutting of soft materials, which requires less manual labor than cutting with dies or knife-edged tools.

Additionally, it is an object of this invention to provide a narrow kerf cutting system whereby waste of soft materials is made substantially less resulting in layout advantages and reduction of trim allowances than with use of knife-like cutters and dies.

The invention has as an another object the provision of a system of cutting soft materials that essentially eliminates problems associated with cutting tool wear or the geometry of cutters based on intersecting surfaces of wedge-shaped cross section.

Yet another object of the invention is to provide a system of high velocity liquid jet or stream cutting which uses an apparatus that is practical, reasonable, and economical to construct and to maintain.

It is a still further object of this invention to teach the high velocity liquid jet cutting of bonded laminates of soft materials without a deleterious distortion of the layers, or separation thereof.

It is another object of this invention to teach the maximizing of the efficiency of the jet cutting of soft materials by minimizing the required expenditure of kinetic energy in the operation.

The above and other objects of this invention will become more apparent from the following specificiation and the drawing.

IN THE DRAWING

The figure is a schematic diagram of one form of apparatus used in the method of the present invention for development of a high velocity liquid jet. The present invention relates to the method for the high velocity liquid jet cutting which comprises: a. providing a soft material which heats at the edges of the cut due to the passage of the liquid jet through the material and has a low thermal conductivity such that the heat is slowly transferred away from the cut and which retains small amounts of the jet liquid in the soft material at the edges of the cut; b. providing a high velocity liquid jet with sufficient energy to cut through the soft material without substantial dispersion of the liquid jet as the soft material is fed through the liquid jet; and c. feeding the soft material through the liquid jet to produce cutting at a rate such that the jet liquid retained at the point of cut volatilizes from the cut within a short period of time due to the heating of the point of cut by the high velocity liquid jet.

The use of liquid jets (particularly aqueous jets) to cut soft materials has been suggested by the prior art however the problem has been that 1. the jet has been of too low an energy density and as a result the jet begins to stagnate in the work and is dispersed during the cutting causing severe wetting of the material being cut, or 2. the jet has had too much dispersion at the nozzle exit producing wetting over the bulk of the material which interferred with the subsequent processing of the soft material being cut. It has now been found that by using preselected feed rates and jet energies with soft materials having certain physical characteristics, these problems can be solved.

It has been found that for each soft material of a particular construction and composition to be cut there is a range of feed rates and jet fluid energies that will heat the edges of the cut due to frictional engagement with the liquid jet sufficiently to vaporize the jet liquid retained in the edges of the cut in a short period of time. Thus it has been found that the method requires:

1. The soft material must be sufficiently soft to be cut while being fed through the liquid jet without substantial dispersion of the jet. Thus relatively hard materials such as ceramics, metals, and thermosetting plastics and the like do not fit into this classification since at none of the presently available energies of high velocity liquid jets is it possible to cut through substantial thickness of these hard materials without stagnation of the liquid jet. The high velocity liquid jet must also have sufficient energy density to cut through the soft material without dispersion as it is being fed through the liquid jet but not so energetic that there is an excess of the jet liquid causing wetting of the bulk of the material.

2. The soft material must be sufficiently resistant to cutting as the soft material is being fed through the liquid jet to produce sufficient heat due to the cutting to volatilize the jet liquid retained at the edges of the cut in a short period of time. Thus the soft material must be thick enough and/or have physical properties (such as the relatively high tensile and tear strengths encountered with soft cellulose and plastic materials) such that this heating occurs. Elevated temperatures are generated at the edges of the cut in the soft material and in certain instances the volatilization of the jet liquid can be seen.

3. The soft material must have a composition and/or construction such that small amounts of jet liquid are retained at the edges of the cut which require removal as a result of the jet cutting. Particularly included are laminate and reticulate materials.

4. The soft material must have a low thermal conductivity such that the heat generated at the edges of the cut is slowly transferred from the edges of the cut into the bulk of the soft material, thereby allowing the heat at the edges of the cut to volatilize the retained jet liquid. Thus soft materials which have a thermal conductivity between about $1 \times 10^{-4}$ and $10 \times 10^{-4}$ g-cal per (sec) (sq. cm.) (°C/cm.) are preferred. Such soft materials are particularly those composed of organic long molecular chains having high molecular weights such as polymers or cellulosic materials.

5. The feed rate of soft material through the high velocity liquid jet must be such that it is neither too slow such that the heat generated in cutting cannot volatilize the jet liquid retained at the edges of the cut or so fast that the liquid jet is dispersed during the cutting causing wetting of the soft material.

6. The jet liquid must volatilize in a short period of time due to the heat generated in the cutting usually less than 5 minutes and preferably less than 1 minute. Thus the jet liquid is usually water alone or aqueous solutions containing small amounts of additives or lubricants to improve cutting or organic liquids having similar volatilization characteristics such as various dry cleaning solvents (perchloroethylene and the like) which do not otherwise effect the soft material being treated.

Within these limitations, a broad range of soft materials and operating conditions are available for the method of the present invention using equipment such as shown in the figure.

In the figure, electric motor 11, drives hydraulic pump 12 (also designated P) which picks up hydraulic fluid 13 through a filter 14 from the hydraulic fluid reservoir 15 through pipe 12a. Fluid from the pump 12, is delivered through pipe 12b at pressures up to 3,000 pounds per square inch, regulated by relief valve 16 which returns excess fluid to reservoir 15 through pipe 16a, to four-way valve 17 through pipe 16b, which controls operation of a double-acting piston 18a in hydraulic cylinder 18 with pressure guage 18b, through pipe 17a leading into the cylinder 18 and pipes 17b and 17c leading away from the cylinder 18 through valve 17 to reservoir 15.

The high-pressure ram 19 and piston 19a, is attached axially to the piston 18a of the cylinder 18, and pressurizes the cutting fluid contained in the high-pressure cell 20, the ratio of output and input pressures being a function of the difference in area of the driving piston 18a and the driven high-pressure ram 19 and piston 19a. High pressure tubing 20a from the cell 20, carries the cutting fluid to the two-way valve 21, which can be used to bleed off air or cutting fluid at 21a as required, but which is normally used to control the flow of cutting fluid to nozzle 22, through high pressure tubing 21b, which ejects a jet 22a of the fluid at the work to be cut 23, for instance with a plurality of laminae 23a as shown, carried on feed table 24. Fluid flow is shown by the arrows in the figure. Motion of the feed table 24, is accomplished by a drive mechanism 25, under the influence of the control system 26. In operation, water or some other suitable cutting liquid is introduced at the top of cell 20 with ram 19 withdrawn, and valve 21 closed; the ram is then brought down to apply pressure, and air in the system is briefly allowed to bleed off from the appropriate side of valve 21; cutting is then accomplished by opening the side of valve 21 leading through tubing 21b to nozzle 22, and moving work 23 by hand, or by means of the table 24 and associated table drive mechanism 25 and control system 26 along the path described by opening 27 in table 24. Usually the distance between the exit of the nozzle 22 and the work 23 is between about one-sixteenth inch and one-fourth inch.

Although the schematic system of the figure requires fluid replenishment, the use of a plurality of pressure intensifying systems, in combination, would allow continuous, rather than intermittent, operation. Moreover, a triplex pump can be utilized to this end. In either case, an accumulator can be incorporated into the fluid system to minimize pressure fluctuations. The provision of such equipment is well known to those in the pumping arts.

Motion between the fluid jet and the work can be obtained by a straight line hydraulic feed system, or by manual movement of the work when something other than a straight elongated cut is desired. It is obvious that relative motion can be obtained in many other fashions without departing from the basic spirit of the invention so long as the liquid jet is not dispersed. For example, the jet axis can be moved rather than the work. Also, motion can be according to various so-called X—Y feeding systems employed with programmed tape and computer type controls of certain machine tools in current industrial use. Use of such systems to provide necessary motion makes it possible to highly automate the cutting, which leads to realization of substantial savings of labor, time, and material as well as great operational flexibility. Such equipment is well known to those skilled in the automatic feed machinery art.

The use of a high velocity fluid stream or jet to cut soft materials such as textiles, films, pliable sheet-like or nonrigid materials and the like without dispersion of the jet, is apparently based on the development of workpiece stresses substantially greater than stress required for local failure, such stresses arising from the momentum and impulse forces of a stream of fluid directed toward the workpiece. The stress developed therein is largely a function of the mass and velocity of the cutting fluid or liquid, as well as the area of impact. The velocity of a liquid stream ejected from a nozzle will in turn be largely dependent on the initiating liquid pressure. Other factors, such as density, viscosity and surface tension of the cutting fluid and the character of the fluid jet or stream produced by the nozzle influence these primary factors.

The nozzle is preferably circular in cross section, although other shapes can be used so long as the nozzle does not produce dispersion of the jet such that the bulk of the material is wetted. The data indicate that the depth of cut and maximum usable feed rate obtainable are roughly proportional to the area of a circular nozzle orifice, although the shape and character of the jet obtained can strongly influence cutting effectiveness.

Suitable practical nozzles can be made from a number of materials; a precipitation hardening stainless steel has proved notably durable and effective. Present nozzle designs have employed orifice diameters from 0.0035 inch to 0.040 inch, with throat length usually about 0.004 inch, but in occasion up to 0.100 inch. The upper diameter limit of the nozzle orifice that can be used is largely determined by the capacity of the fluid pumping system to maintain required pressure levels and the resulting velocities, but 0.1 inch is the preferred limit. The lower limit of nozzle size is determined largely by practical considerations such as ability to produce minute orifices, clogging of the nozzle, and feed rate or depth of cut requirements but usually about 0.001 inch is the practical lower limit.

For most soft materials, textiles, pliable sheets, and resilient materials, jet velocities between about 1,200 and 2,400 feet per second have been shown to be adequate to obtain practical combinations of depth of cut and feed rate although much higher velocities to 4,000 feet per second or above can be used so long as there is no dispersion of the jet at the nozzle exit due to the elevated pressures required to achieve these higher velocities which produces wetting of the bulk of the soft material. Jet velocities of 1,200 to 2,400 feet per second have been obtained at fluid driving pressures between about 10,000 and 50,000 pounds per square inch, when ejecting water into the atmosphere through a circular nozzle orifice. Higher velocities up to and above 4,000 feet per second can be obtained using pressures up to 100,000 pounds per square inch, although it is unnecessarily expensive and in many instances can produce unwanted dispersion of the jet as it leaves the nozzle.

With a circular nozzle orifice 0.008 inch in diameter and using a fluid driving pressure of 45,000 pounds per square inch on water, a stack of 55 layers of nylon and cotton fabric with a total thickness of about 1½ inches was cut cleanly through at feed rates of 70 inches per minute up to about 250 inches per minute without dispersion of the jet and with volatilization of the retained water at the edges of the cut. The nozzle exit was one quarter inch (¼") from the top of the stack. At similar pressure and nozzle conditions the same feed rate was achieved with a stack of fabric-backed expanded vinyl sheet over 3 inches in height composed of 40 layers. Tests have similarly shown effective cutting of total depths in excess of 4 inches in nonwoven unstretched nylon fiber mats or felts, and over 6 inches in urethane and polystyrene foams under these conditions.

So long as the liquid stream ejected from the nozzle is capable of cutting the work material, increases in pressure or nozzle diameter can be used to increase feed rate. Similar improvement of cutting capability has been observed by optimizing jet characteristics flowing from the nozzle apparently reflecting increases in energy density of the fluid stream. Conversely, it has been observed that there is a minimum pressure exerted by the fluid jet below which effective cutting and penetration is not obtained at the feed rate selected. It has also been observed that in workpiece materials, which are too thick for the jet energy used, such as polypropylene in sheets over one-half inch in thickness under the above specified conditions of 0.008 inch and nozzle fluid pressure of 45,000 pounds per square inch, the fluid jet is dispersed by being impeded in the cut due to back pressure caused by the accumulation of spent fluid causing severe wetting.

It is relatively easy and economical to produce a stream or jet of liquid with a velocity sufficient to practice this invention as discussed above. Several commercially available pumping systems can be utilized which are based on one or more reciprocating intensifier cylinders hydraulically actuated or driven by crank or cam shafts. Such pressure systems are currently in use in the petroleum industry, research laboratories, and elsewhere.

One outstanding feature of this invention is the versatility of the system of cutting by means of a high energy stream of fluid where the heat from the cutting volatilizes the jet liquid at the edges of the cut. It has been found that the jet of liquid can be stopped and started rapidly with simple valving and bypass devices. This makes the invention well suited to situations where intermittent cutting is required, such as self-closed cutouts or slits, or where efficiency requires the nozzle to pass over the work to a predetermined location without cutting enroute. The freedom of the cutting path available with this invention permits detailed, accurate cutting along virtually any path that can be described by a moving point. Clean sharp cuts which do not retain the jet liquid have been obtained in producing small triangular cutouts in vinyl and fabrics. Such cuts have been obtained to a depth of over 1¼" representing 50 layers of nylon and cotton fabric, and to a depth of over 3 inches composed of 40 layers of fabric-backed expanded vinyl. The sharp detail and accuracy of cut through many layers of materials which is obtainable with this invention provides a means of approaching accuracies and detail associated with die cutting, while at the same time simultaneously cutting many more layers of work than is possible with die cutting. Similarly, the invention provides for the cutting of multiple layers such as is presently done with disk or reciprocating cutters, but is capable of greater accuracy and detail. It follows that the present invention provides an opportunity for substantial savings of labor and material. The invention lends itself to use in operations where the cutting path may be predetermined and controlled by a stylus or follower mechanism, or by an automated programming device as already described. The invention also makes it possible to arrange various shapes and sizes of contours so as to reduce the waste unavoidable with present methods of die cutting or knife cutting of textiles and other such sheet materials.

A particularly novel and efficacious use for the liquid jet cutting system already described, is its application to cutting of bonded layers of laminated materials, such as the laminated flexible layers, cotton-backed vinyl fabrics or cardboard, as shown in the figure. Laminated layers 23a can flexibly separate using the ordinary saw blade method of cutting. The high velocity liquid jet method of the present invention will cut such laminates without this undesirable parting of the laminated layers 23a and produce a sharp cut. The explanation may be offered that the thin liquid stream cuts by direct impact-destruction, fiber crushing, and the like, from head-on collision with the material at the line of cut, without an accompanying excessive frictional drag on the parted segments at either side of the kerf. Ordinary sawing devices frictionally drag on the kerf sides, tending to pull flexible material layers apart along planes normal to the sawing direction, especially when the saw is moving away from the table or other material supporting platform.

Similarly, when using rotating discs or dies the cutting tends to compress the laminated layers together. This is normally not objectionable, except in construction like boxboard, which is comprised of a corrugated layer between two outside, flat cardboard layers. In this setting, the compression crushes the paper corrugation and pinches the upper cardboard layer downward toward the lower, opposite side of the construction making subsequent processing difficult. The present invention overcomes this difficulty by producing a clean sharp cut as shown in the figure.

Both of these above described difficulties (i.e. laminate separation, and the converse effect of compressive crushing, or pinching) in the vicinity of cut are eliminated by the high velocity liquid stream of jet cutting, apparently due to the elimination of kerf drag, which accompanies mechanical sawing techniques. Consequently this new cutting method is of paramount significance to those involved in the cutting of saw separable or otherwise deformable soft laminate structures. Hydrojets, i.e. water jets, particularly, were found to have the above described desirable result with respect to boxboard cutting.

Particular studies have led to the discovery of particular useful methods for maximizing the efficiency of liquid jet cutting of corrugated sheet and cardboard media using the method of the present invention. Table 1A shows the results of a study directed to determining the effects of variation on liquid pressure ($p$) and jet nozzle diameter (D). The particular material being cut is characterized by its weight in pounds per square foot, and Table 1A shows the results of processing on several materials being fed at a rate of 351 feet/minute. Each material was cut at the three separate combinations of nozzle diameter and liquid pressure. The corresponding energy, proportional to $p^{3/2}D^2$ (based upon Bernoulli's theorem where gravitational acceleration is considered negligible and the fact that energy is equal to a constant times the mass times the velocity squared) is shown, and the lowest energy for each test point is underlined in the table. Similar results are shown in Tables 1B and 1C for feed rates of 585 and 925 feet per minute respectively. Blank entries in the tables indicate that incomplete cutting was obtained for that particular nozzle diameter at the cutting feed rates shown. Jet liquid retained at the edges of the cut volatilized within 5 to 60 seconds and the edges of the cut were clean and sharp.

TABLE IA (FEED RATE=351 FT./MIN.)[1]

| Material density, lb./ft.² | .0065" diam., pressure, K s.i. | Energy, ft.-lb./sec. ÷1,000 | .0091" diam., pressure, K s.i. | Energy, ft.-lb./sec. ÷1,000 | .012" diam., pressure, K s.i. | Energy, ft.-lb./sec. ÷1,000 |
|---|---|---|---|---|---|---|
| .108 | 35 | 2.6 | 20 | 2.3 | 20 | 4.1 |
| .126 | 35 | 2.6 | 20 | 2.3 | 20 | 4.1 |
| .176 | 35 | 2.6 | 35 | 5.3 | 20 | 4.1 |
| .199 | 35 |  | 35 | 5.3 | 20 | 4.1 |
| .222 | 35 |  | 50 | 8.9 | 20 |  |

[1] Underlined energy value is lowest of three for a given density and feed rate. The pressure given below each nozzle size is the lowest of the three tested that cut successfully; the energy value is the energy for that pressure and is proportional to $p^{3/2}D^2$; the pressure is given in K s.i. (thousand pounds per square inch). The actual high velocity waterjet energy in foot-pounds per second is determined by multiplying $p^{3/2}D^2$ by the constant 9.50 where the pressure ($p$) is in pounds per square inch and the diameter D is in inches. The velocity is equal to 12.2 $(p)^{1/2}$ in feet per second when the fluid is water and where $p$ is the pressure in pounds per square inch. The cardboard was standard commercial construction:

| | Liners, lb./1,000 ft.² | Corrugated medium, lb./1,000 ft.² |
|---|---|---|
| Density, lb./ft.²: | | |
| .108 | Two, 26 | One 26 C, flute. |
| .126 | Two, 42 | Do. |
| .176 | Two, 69 | Do. |
| .199 | Three, 42 | Two 26 CB, flute. |
| .222 | Two, 90 | One 26 C, flute. |

TABLE IB (FEED RATE=585 FT./MIN.)[1]

| Material density, lb./ft.² | .0065" diam., pressure, K s.i. | Energy, ft.-lb./sec. ÷1,000 | .0091" diam., pressure, K s.i. | Energy, ft.-lb./sec. ÷1,000 | .012" diam., pressure, K s.i. | Energy, ft.-lb./sec. ÷1,000 |
|---|---|---|---|---|---|---|
| .108 | 50 | 4.5 | 35 | 5.3 | 20 | 4.1 |
| .126 | 50 | 4.5 | 35 | 5.3 | 20 | 4.1 |
| .176 | 50 | 4.5 | 50 | 8.9 | 20 | 4.1 |
| .199 | 50 |  | 50 | 8.9 | 20 | 4.1 |
| .222 | 50 |  | 50 |  | 20 |  |

[1] Underlined energy value is lowest of three for a given density and feed rate. The pressure given below each nozzle size is the lowest of the three tested that cut successfully; the energy value is the energy for that pressure and is proportional to $p^{3/2}D^2$; the pressure is given in K s.i. (thousand pounds per square inch). The actual high velocity waterjet energy in foot-pounds per second is determined by multiplying $p^{3/2}D^2$ by the constant 9.50 where the pressure ($p$) is in pounds per square inch and the diameter D is in inches. The velocity is equal to 12.2 $(p)^{1/2}$ in feet per second when the fluid is water and where $p$ is the pressure in pounds per square inch. The cardboard was standard commercial construction:

| | Liners, lb./1,000 ft.² | Corrugated medium, lb./1,000 ft.² |
|---|---|---|
| Density, lb./ft.²: | | |
| .108 | Two, 26 | One 26 C, flute. |
| .126 | Two, 42 | Do. |
| .176 | Two, 69 | Do. |
| .199 | Three, 42 | Two 26 CB, flute. |
| .222 | Two, 90 | One 26 C, flute. |

TABLE IC (FEED RATE=925 FT./MIN.)[1]

| Material density, lb./ft.² | .0065" diam., pressure, K s.i. | Energy, ft.-lb./sec. ÷1,000 | .0091" diam., pressure, K s.i. | Energy, ft.-lb./sec. ÷1,000 | .012" diam., pressure, K s.i. | Energy, ft.-lb./sec. ÷1,000 |
|---|---|---|---|---|---|---|
| .108 | 50 | 4.5 | 35 | 5.3 | 20 | 13.0 |
| .126 | 50 | 4.5 | 35 | 5.3 | 20 | 13.0 |
| .176 | 50 | 4.5 | 50 | 8.9 | 20 | 13.0 |
| .199 | 50 |  | 50 | 8.9 | 20 |  |
| .222 | 50 |  | 50 |  | 20 |  |

[1] Underlined energy value is lowest of three for a given density and feed rate. The pressure given below each nozzle size is the lowest of the three tested that cut successfully; the energy value is the energy for that pressure and is proportional to $p^{3/2}D^2$; the pressure is given in K s.i. (thousand pounds per square inch). The actual high velocity waterjet energy in foot-pounds per second is determined by multiplying $p^{3/2}D^2$ by the constant 9.50 where the pressure ($p$) is in pounds per square inch and the diameter D is in inches. The velocity is equal to 12.2 $(p)^{1/2}$ in feet per second when the fluid is water and where $p$ is the pressure in pounds per square inch. The cardboard was standard commercial construction:

| | Liners, lb./1,000 ft.² | Corrugated medium, lb./1,000 ft.² |
|---|---|---|
| Density, lb./ft.²: | | |
| .108 | Two, 26 | One 26 C, flute. |
| .126 | Two, 42 | Do. |
| .176 | Two, 69 | Do. |
| .199 | Three, 42 | Two 26 CB, flute. |
| .222 | Two, 90 | One 26 C, flute. |

The conclusion derived from these examples is that a lower pressure with a larger nozzle gives better efficiency, since the lowest energy factor was usually for the .012 inch diameter nozzle at 20 K s.i. This agrees with other tests which have shown cut depth proportional to $pD^2$ instead of $p^{3/2}D^2$. Since the jet energy is proportional to $p^{3/2}D^2$, it appears that cutting efficiency drops off as $p^{1/2}$. Also, nozzles are likely to cost less in larger sizes, and will wear less at lower pressures. However, increasing the pressure may improve cut quality, and will reduce initial wetting (thereby speeding up volatilization of the jet fluid) and fluid consumption. Hence, it is necessary to choose the best compromise for any given situation. In general, a feed rate of between about 100 to 3,000 feet per minute was found to be satisfactory for corrugated cardboard.

Tables IIA, IIB, IIC show the effect of increased feed rate upon the energy required to cut, the increase of which was less than the linear relation to increasing feed rate that one might expect. This surprisingly low increase required in energy (which has been confirmed in other soft materials) indicates that the most efficient cut uses a high feed rate.

TABLE IIA (MATERIAL DENSITY .126 [1])

| Feed rate (R) ft./min. | Pressure (p) K s.i. | Energy (ft.-lb./sec. ÷ 1,000) |
|---|---|---|
| 351 | 9.25 | 1.2 |
| 585 | 11.75 | 1.7 |
| 925 | 12.75 | 2.1 |

TABLE IIB (MATERIAL DENSITY .176 [1])

| Feed rate (R) ft./min. | Pressure (p) K s.i. | Energy (ft.-lb./sec. ÷ 1,000) |
|---|---|---|
| 351 | 14.0 | 2.4 |
| 585 | 15.0 | 2.6 |
| 925 | 16.75 | 3.1 |

TABLE IIC (MATERIAL DENSITY .199 [1])

| Feed rate (R) ft./min. | Pressure (p) K s.i. | Energy (ft.-lb./sec. ÷ 1,000) |
|---|---|---|
| 351 | 14.25 | 2.4 |
| 585 | 16.5 | 3.1 |
| 925 | 19.50 | 4.0 |

[1] Material Densities (given in pounds as shown in Table I. All nozzles and the pressure p is that require

[1] Material Densities (given in pounds per square foot) were produced as shown in Table I. All nozzles had a diameter D of 0.012 inches, and the pressure $p$ is that required to just cut the material.

Tables IA, IB, and IC, as already discussed, show that lower pressure and larger nozzle diameters also lead to maximal efficiency from an energy view point. Thus large nozzle diameters, low pressures, and high feed rates will give the highest energy based efficiencies. Considerations of cut quality, kerf width, and initial wetting which affects the length of time necessary for the volatilization of the jet liquid from the edges of the cut, will determine how low a pressure can be used.

The composition and construction of the soft material which is cut determines the range of pressures on the fluid and nozzle diameters or jet energies to be used. Within these ranges, it has been found that there is fairly wide feed rate range at a given pressure and nozzle diameter for a material of a particular composition and construction and usually a feed rate at least 50 percent of the maximum feed which produces a clean cut allows for volatilization of the jet liquid from the edges of the cut.

It is apparent from the above description of the present invention, various adaptations, modifications, and substitutions can be presented therefor without departing from its spirit and it is intended that the present invention be limited only by the hereinafter appended claims.

I claim:

1. The method for the high velocity liquid jet cutting which comprises:
   a. providing a soft material which heats at the edges of the cut due to the passage of the liquid jet through the material and has a low thermal conductivity such that the heat is slowly transferred away and which retains small amounts of the liquid in the soft material at the edges of the cut;
   b. providing a high velocity liquid jet from a nozzle at a velocity between about 1,200 and 4,000 feet per second without dispersion of the jet at the nozzle exit which dispersion during cutting produces wetting of the bulk of the soft material and with sufficient energy to cut through the soft material without stagnation of the liquid jet in the cut in the soft material causing bulk wetting as the soft material is fed through the liquid jet; and
   c. feeding the soft material through the liquid jet to produce cutting at a rate such that the jet liquid retained at the point of cut volatilizes from the cut within a short period of time due to the heating of the point of cut by the high velocity liquid jet.

2. The method of claim 1 wherein the composition of the soft material is such that it retains liquid at the edges of the cut from the liquid jet.

3. The method of claim 2 wherein the soft material contains cellulose.

4. The method of claim 1 wherein the construction of the soft material is such that it retains liquid at the edges of the cut from the liquid jet.

5. The method of claim 4 wherein the construction of the soft material is a laminate which retains liquid between the laminae at the edges of the cut.

6. The method of claim 4 wherein the construction of the soft material is of fibers which retains liquid between the fibers at the edges of the cut.

7. The method of claim 4 wherein the construction of the soft material is of strands which retain liquid between the strands of the edges of the cut.

8. The method of claim 1 wherein the jet liquid is aqueous and volatilizes from the edges of the cut within a short period of time at the selected feed rate.

9. The method of claim 1 wherein the liquid jet is an organic liquid which volatilizes from the edges of the cut within a short period of time at the selected feed rate.

10. The method of claim 1 wherein the soft material is composed of a high molecular weight, long chain organic material.

11. The method of claim 1 wherein the soft material is cardboard with a density between about 0.1 and 0.3 pounds per square foot, wherein the feed rate of the cardboard is between about 100 and 5,000 feet per minute; and wherein the jet liquid is water.

12. The method of claim 1 wherein the jet liquid volatilizes from the edges of the cut in the soft material in less than about 5 minutes.

13. The method of claim 1 wherein the components of the soft material have a thermal conductivity between about $1 \times 10^{-4}$ and $10 \times 10^{-4}$ g-cal per (sec.) (sq. cm) (°C/cm.).